(12) United States Patent
Krishnaswamy (10) Patent No.: US 8,280,916 B2
(45) Date of Patent: Oct. 2, 2012

(54) DATA LOCALITY IN A SERIALIZED OBJECT STREAM

(75) Inventor: Ravinder P. Krishnaswamy, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 1240 days.

(21) Appl. No.: 11/537,974

(22) Filed: Oct. 2, 2006

(65) Prior Publication Data
US 2008/0082552 A1   Apr. 3, 2008

(51) Int. Cl.
*G06F 17/30* (2006.01)
(52) U.S. Cl. .................................. 707/802; 707/791
(58) Field of Classification Search ....... 707/100–104.1, 707/802, 791
See application file for complete search history.

(56) References Cited

U.S. PATENT DOCUMENTS

| | | | |
|---|---|---|---|
| 6,704,736 B1* | 3/2004 | Rys et al. | 707/100 |
| 6,751,623 B1* | 6/2004 | Basso et al. | 707/101 |
| 7,216,127 B2* | 5/2007 | Auerbach | 707/100 |
| 2005/0203957 A1* | 9/2005 | Wang et al. | 707/104.1 |

* cited by examiner

*Primary Examiner* — Huawen Peng
(74) *Attorney, Agent, or Firm* — Gates & Cooper LLP (57) ABSTRACT

A computer-implemented method and apparatus for providing data locality in a serialized object stream. Data is extracted from an object into the serialized object stream, thereby creating a simple data stream. Data of a specified type is then relocated from the extracted data to a contiguous section within the serialized object stream, thereby creating an enhanced data stream. The enhanced data stream is formatted in such a manner as to provide backward compatibility with the simple data stream.

27 Claims, 6 Drawing Sheets

DATA LOCALITY IN A SERIALIZED OBJECT STREAM

BACKGROUND OF THE INVENTION

1. Field of the Invention

The present invention relates generally to object-oriented systems, and in particular, to data locality in a serialized object stream.

2. Description of the Related Art

Many applications do not have a complete or efficient mechanism for extracting data of a specific type from objects. For example, current schemes may require opening each of the objects, and knowing which properties or types to query the object for a-priori.

In addition, if the objects are custom objects, current solutions require custom object enablers to be present in order to extract data of a specific type from the custom objects. If these custom object enablers are not present, it may not be possible to extract data of a specific type from the custom object.

Consequently, there is a need in the art for a mechanism that extracts data of a specific type from an object, even when an enabler for the object is not available. The present invention satisfies that need.

SUMMARY OF THE INVENTION

To overcome the limitation in the prior art described above, and to overcome other limitations that will become apparent upon reading and understanding the present specification, the present invention describes a computer-implemented method and apparatus for providing data locality in a serialized object stream. Data is extracted from an object into the serialized object stream, thereby creating a simple data stream. Data of a specified type is then relocated from the extracted data to a contiguous section within the serialized object stream, thereby creating an enhanced data stream. The enhanced data stream is formatted in such a manner as to provide backward compatibility with the simple data stream.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, an embodiment of the present invention. It is understood that other embodiments may be utilized and structural changes may be made without departing from the scope of the present invention.

Hardware and Software Environment

Figure 1:
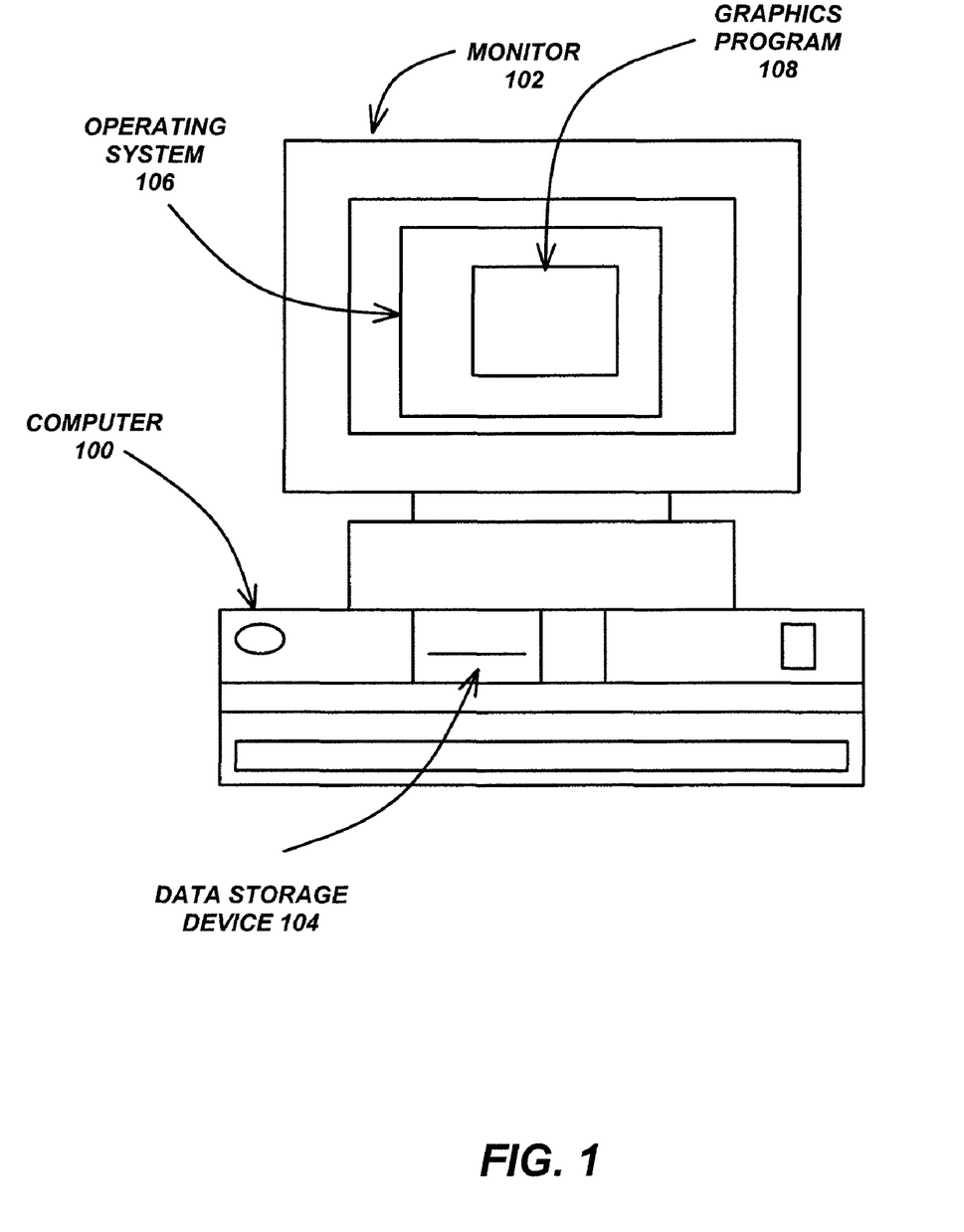
FIG. 1 is an exemplary hardware and software environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, data storage devices 104, and other devices. Those skilled in the art will recognize that any combination of the above components, or any number of different components, peripherals, and other devices, may be used with the computer 100.

The computer 100 usually operates under the control of an operating system 106, which is represented by a window displayed on the monitor 102. The preferred embodiment of the present invention is implemented by a computer-implemented graphics program 108 that operates under the control of the operating system 106, wherein the graphics program 108 is also represented by a window displayed on the monitor 102.

Generally, the operating system 106 and graphics program 108 comprise logic, instructions and/or data embodied in or readable from a device, media, or carrier, e.g., one or more fixed and/or removable data storage devices 104 connected directly or indirectly to the computer 100, one or more remote devices coupled to the computer 100 via data communications devices, etc.

Those skilled in the art will recognize that the present invention may be implemented in alternative environments. Indeed, those skilled in the art will recognize that the present invention may be implemented in alternative computer programs.

Computer-Implemented Graphics Program

Figure 2:
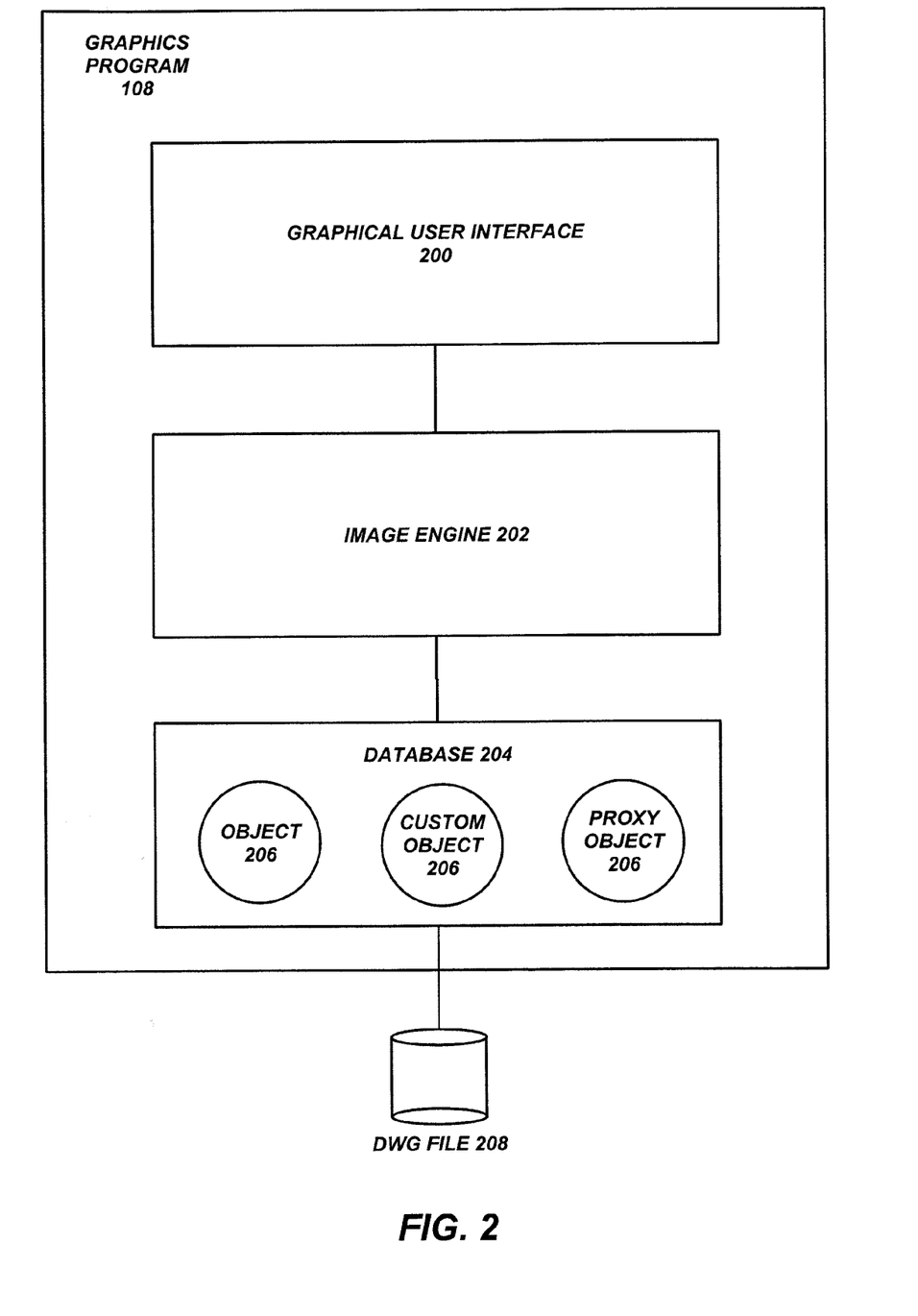
FIG. 2 is a block diagram that illustrates the components of the graphics program according to the preferred embodiment of the present invention.

FIG. 2 is a block diagram that illustrates the components of the graphics program 108 according to the preferred embodiment of the present invention. There are three main components to the graphics program 108, including: a graphical user interface (GUI) 200, an image engine (IME) 202, a database (DB) 204 for storing objects 206, and a drawing (DWG) file 208.

The GUI 200 displays information to the user and provides the functionality for the user's interaction with the graphics program 108. The IME 202 processes the objects 206 in the DB 204, and delivers the resulting graphics to an output device. The DB 204 maintains the objects 206 used by the graphics program 108 in the memory of the computer 100. Finally, the DB 204 itself is persistently stored as a DWG file 208 on the data storage device 104, or may be transmitted or shared with other users on other computers.

Those skilled in the art will recognize that the present invention may be applicable to alternative databases, objects or files.

Object Structure

Generally, the DB 204 and DWG file 208 are heterogeneous, and thus may contain many types of objects 206. For example, the objects found in the DB 204 and DWG file 208 may be objects 206 native to the graphics program 108. Alternatively, the objects 206 found in the Database 204 and DWG file 208 may be custom objects 206 created by another program and made available to the graphics program 108 through the use of custom object 206 enablers.

Custom objects 206 are intelligent design objects, which can be manipulated by the graphics program 108, according to their inherent characteristics. However, a custom object 206 may be substituted in the graphics program 108 with a proxy object 206 when the custom object 206 enabler is absent during execution of the graphics program 108. This allows users to share DWG files 208 with any user that has the graphics program 108, whether or not the users have installed the custom object 206 enabler.

Operation of the Preferred Embodiment

The preferred embodiment of the present invention provides a mechanism for extracting data of a specified type from an object 206, regardless of whether the object 206 is native to the graphics program 108, is a custom object 206, or is a proxy object 206. Specifically, the mechanism intercepts data of a specified type as it is streamed out of an object 206 (it is assumed that the object 206 has a function that outputs its data in a stream), and redirects the intercepted data to a separate location in the serialized data stream.

In this way, the graphics program 108 does not need to interpret the object 206 itself. Moreover, the graphics program 108 avoids any "brute force" approaches to searching the object 206 for the specified type of data.

In the example described herein, data having a string type is extracted from the streamed object 206 data. However, the present invention is applicable to any type of object 206 data.

The operation of the preferred embodiment has three key aspects:

1. The logical layout of data,
2. The algorithms for reading and generating the layout, and
3. The round-trip processing of custom objects 206 in a proxied state.

The logical layout of data includes a backward relative offset scheme to store string data contiguously. In addition to space efficiency considerations, the main purpose of the backward relative offset scheme is to provide for round-trip processing of custom objects 206 in a proxied state.

Figure 3:
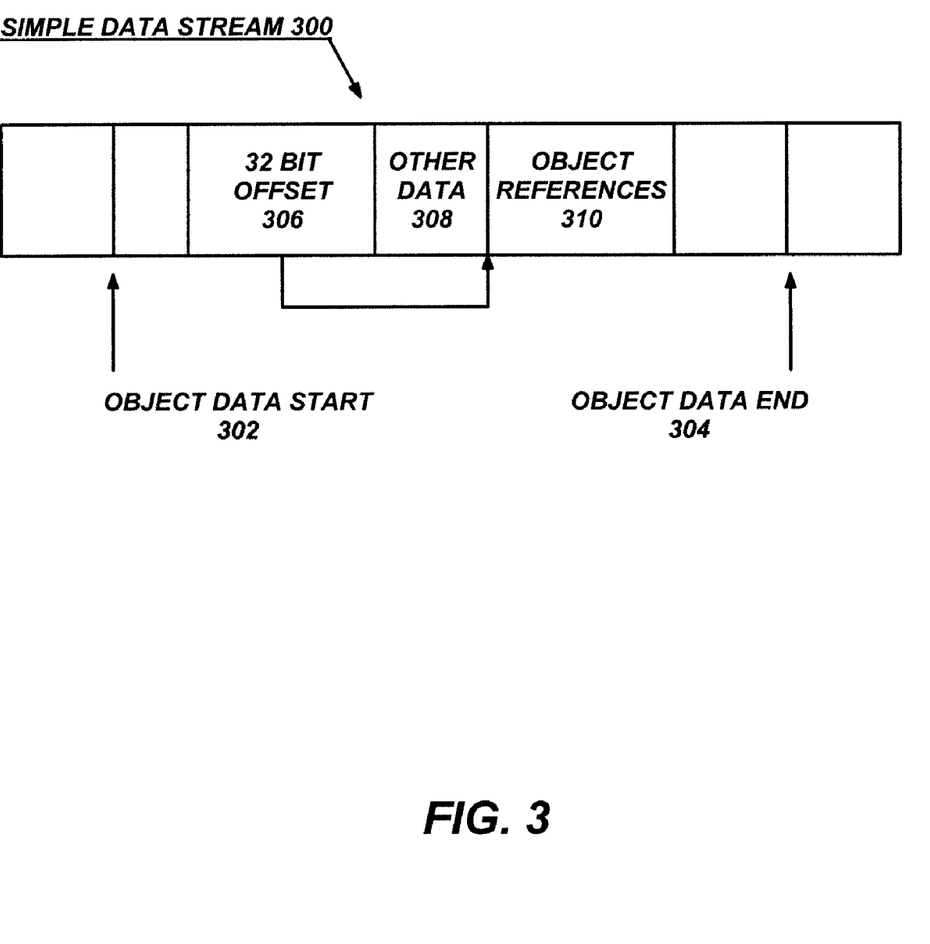
FIG. 3 is a block diagram of the existing data stream according to the preferred embodiment of the present invention.

FIG. 3 is a block diagram of a serialized object stream that comprises a simple data stream 300 according to the preferred embodiment of the present invention. The simple data stream 300 includes an object data start 302 and object data end 304, a 32 bit offset 306, other data 308 and object references 310, between 302 and 304, wherein the 32 bit offset 306 is a relative offset (from the object data start 302) that points to the object references 310.

Figure 4:
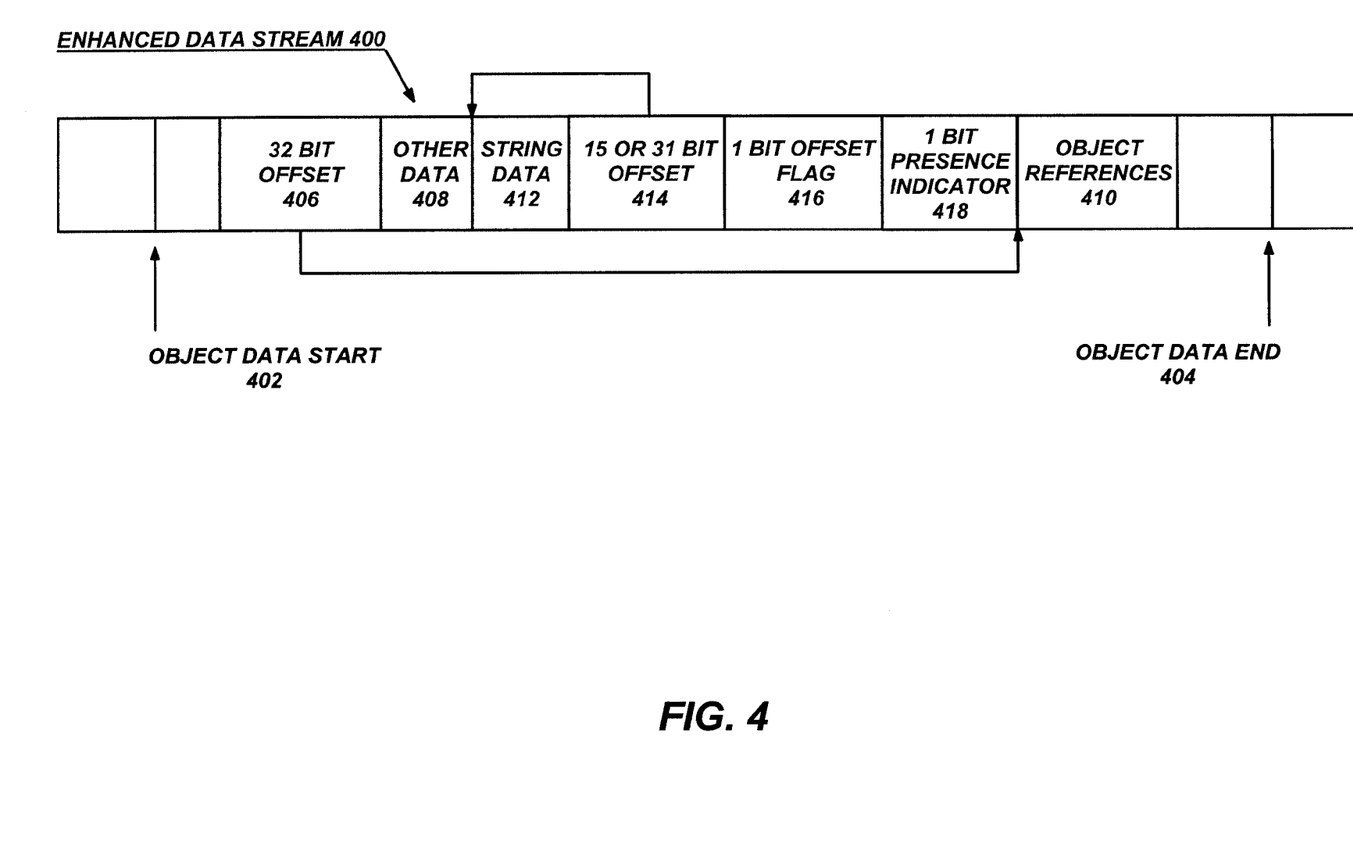
FIG. 4 is a block diagram of the enhanced data stream according to the preferred embodiment of the present invention.

FIG. 4 is a block diagram of a serialized object stream that comprises an enhanced data stream 400 according to the preferred embodiment of the present invention. The enhanced data stream 400, like the simple data stream 300, comprises an object data start 402 and object data end 404, a 32 bit offset 406, other data 408 and object references 410, between 402 and 404, wherein the 32 bit offset 406 is a relative offset (from the object data start 402) that points to the object references 410. However, relocated data is prepended to the object references 410 in the enhanced data stream 400, and includes string data 412, a 15 or 31 bit offset 414, a 1 bit offset flag 416, and a 1 bit presence indicator 418, wherein the 15 or 31 bit offset 414 is a relative offset (from the object data start 402) that points to the string data 412, the 1 bit offset flag 416 indicates that whether the 15 or 31 bit offset 414 is 15 or 31 bits, and the 1 bit presence indicator 418 indicates whether the string data 412 is present in the enhanced data stream 400.

Figures 5A, 5B:
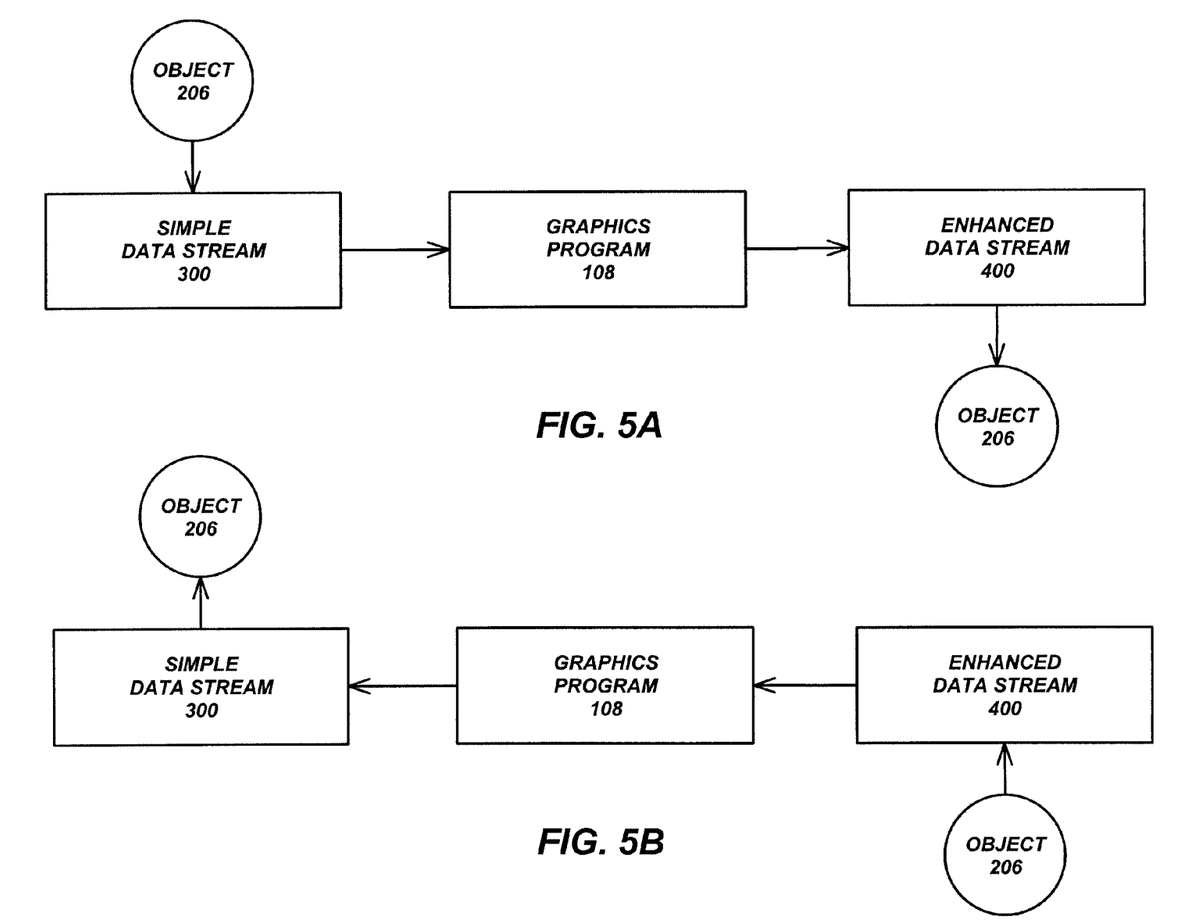
FIGS. 5A and 5B are block diagrams that illustrate the logic for providing data locality in a serialized object stream according to the to the preferred embodiment of the present invention.

FIGS. 5A and 5B are block diagrams that illustrate the logic for providing data locality in a serialized object stream according to the to the preferred embodiment of the present invention. Specifically, these figures describe the algorithms for reading and writing the data include the handling of both streaming out and streaming in of data by the objects 206.

In FIG. 5A, data from an object 206 is extracted into a serialized object stream, by streaming the data out of the object 206, thereby creating the simple data stream 300. The simple data stream 300 is then processed by the graphics program 108 (or another program) to relocate data of a specified type to a specified location comprising a contiguous section within the serialized object stream, thereby creating the enhanced data stream 400. In this regard, the string data that is streamed out by an object 206 is gathered into a separate buffer by the graphics program 108. After the object 206 has completed streaming out its data, the graphics program 108 creates the enhanced data stream 400 that includes the string data 412, which is prepended to the object references 410, along with the 15 or 31 bit offset 414, 1 bit offset flag 416, and 1 bit presence indicator 418. This enhanced data stream 400 can then be resaved within an object 206.

In a like manner, in FIG. 5B, data from an object 206 is extracted into a serialized object stream, by streaming the data out of the object 206, thereby creating the enhanced data stream 400. The enhanced data stream 400 is then processed by the graphics program 108 (or another program), wherein the graphics program 108 maintains a cursor to access the string data 412, so that even though the reading of other types of data in the object streaming code are intermingled with the reading of the string data 412, to the object streaming code, the data will seem as if it were contiguous. Moreover, the graphics program 108 (or other program) can treat the enhanced data stream 400 as the simple data stream 300, due its backward compatibility, resulting from the reverse offset layout of the relocated string data 412 when prepended to the object references 410. This simple data stream 300 can then be resaved within an object 206.

This backward compatibility has special significance with regard to the round-trip processing of custom objects 206 in a proxied state, where programs only recognize the simple data stream 300. This aspect of the present invention allows such programs to use the enhanced data stream 400.

Consider the following scenario:

1. The data in a custom object 206 is streamed out by a custom object 206 enabler to the simple data stream 300, and then the string data is relocated in creating an enhanced data stream 400.
2. The custom object 206 enabler is unloaded, so that the custom object 206 is in a proxied state.
3. The enhanced data stream is then re-saved in the custom object 206 in the DWG file 208.
4. The DWG file 208 is opened by another program that only recognizes the existing data stream 300.

Due to the reverse offset layout of the string data 412, which is prepended to the object references 410, along with the 15 or 31 bit offset 414, 1 bit offset flag 416, and 1 bit presence indicator 418, a program that is only capable of processing the simple data stream 300 can access the enhanced data stream 400 as the simple data stream 300.

Specifically, a program that is only capable of processing the simple data stream 300, typically treating this custom object data as a blob of unknown data, is not confused by the partitioning of the string data 412 in the enhanced data stream 400. Moreover, there is no loss of functionality, except that the program that is only capable of processing the simple data stream 300 will not know how to access the string data 414. As a result, the enhanced data stream 400 provides backward compatibility with the simple data stream 300.

The utility of efficient string data extraction facilitated by the present invention is that it allows searching for string data within DWG files 208 through applications like indexing services (such as the Microsoft Windows Indexing Service). Existing methods for identification of string data within streamed object 206 data are complex, because they require special checks for each type of object 206 data being processed. This is further complicated with custom objects 206 where, for example, if a custom object 206 enabler is not present, then the string type data for that custom object 206 cannot normally be identified.

Furthermore, the present invention addresses two other constraints for any solution involving object 206 format change: efficiency, and round-trip processing of proxy objects 206. With regard to efficiency, the present invention provides a solution that is efficient with minimum overhead for objects 206 without string data.

With regard to round-trip processing of proxy objects 206, when the enhanced data stream 400 is saved as a custom object 206 in a proxied state (i.e., an object 206 enabler is not present), the enhanced data stream 400 will survive intact any operations by programs that are unaware of the enhanced data stream 400 format, and are only aware of the simple data stream 300 format.

Note also that, in alternative embodiments, the relocated data in the enhanced data stream 400 may include optional type information. This optional type information allows the graphics program 108, or other program, to differentiate between types of string data 412, for example, to differentiate between uniform resource identifiers (URIs), file names, symbol names, etc., found within the string data 412.

Figure 6A:
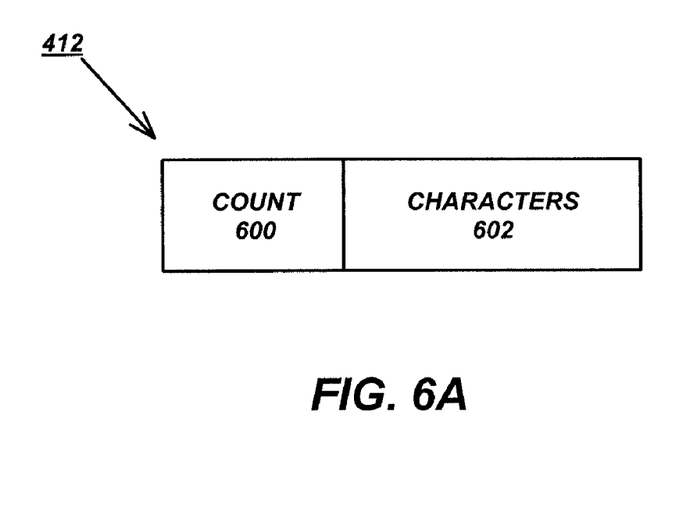
FIGS. 6A and 6B show the structure of the relocated data including optional type information according to alternative embodiments of the present invention.

For example, FIG. 6A shows the structure of the string data 412 in one embodiment, where the string data 412 includes a count 600 and one or more characters 602, wherein the count 600 indicates the number of characters 602.

Figure 6B:
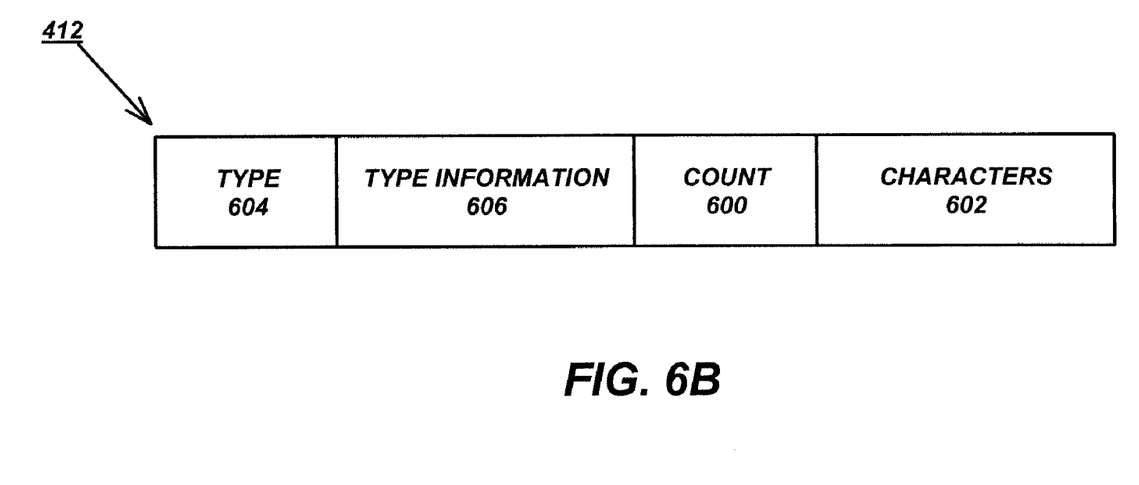

In another example, FIG. 6B shows the structure of the string data 412 in another embodiment, where the string data 412 includes a type 604 and type information 606, as well as the count 600 and characters 602. The type 604 and type information 606 provides the flexibility of representing more type information along with string data 412.

Conclusion

This concludes the description of the preferred embodiment of the invention. The following describes some alternative embodiments for accomplishing the present invention. For example, any type of computer could be used with the present invention. In addition, any program, function, or system providing similar functions could benefit from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for providing data locality in a serialized object stream, comprising:
   (a) extracting, in a computer, data from an object into a serialized object stream, thereby creating a simple data stream comprised of an offset, which is followed by other data, which is followed by object references, wherein the offset, other data and object references are all located between an object data start and object data end, and the offset is a relative offset from the object data start that points to the object references; and
   (b) relocating, in the computer, data of a specified type from the extracted data to a specified location in the serialized object stream, thereby creating an enhanced data stream comprised of the offset, which is followed by the other data, which is followed by the relocated data, which is followed by the object references, wherein the offset, other data, relocated data and object references are all located between the object data start and object data end, the offset is the relative offset from the object data start that points to the object references, and the enhanced data stream is formatted in such a manner as to provide backward compatibility with the simple data stream, so that a program that is only capable of processing the simple data stream can access the enhanced data stream as the simple data stream.

2. The method of claim 1, wherein the extracting step comprises streaming the data out of the object.

3. The method of claim 1, wherein the object is a native object.

4. The method of claim 1, wherein the object is a custom object and the data is extracted by a custom object enabler.

5. The method of claim 1, wherein the relocated data is relocated to a contiguous section within the serialized object stream.

6. The method of claim 1, wherein the relocated data is prepended to the object references.

7. The method of claim 1, wherein the relocated data includes an offset, offset flag and presence indicator, the offset is a relative offset from the object references that points to the relocated data, the offset flag indicates a type of offset, and the presence indicator indicates whether the relocated data is prepended to the object references.

8. The method of claim 1, wherein the enhanced data stream is processed as an existing data stream, due to the relocated data's reverse offset layout, thereby providing the backward compatibility.

9. The method of claim 1, wherein the relocated data includes optional type information.

10. An apparatus for providing data locality in a serialized object stream, comprising:
    a computer; and
    logic, performed by the computer, for:
    (a) extracting data from an object into a serialized object stream, thereby creating a simple data stream comprised of an offset, which is followed by other data, which is followed by object references, wherein the offset, other data and object references are all located between an object data start and object data end, and the offset is a relative offset from the object data start that points to the object references; and
    (b) relocating data of a specified type from the extracted data to a specified location in the serialized object stream, thereby creating an enhanced data stream comprised of the offset, which is followed by the other data, which is followed by the relocated data, which is followed by the object references, wherein the offset, other data, relocated data and object references are all located between the object data start and object data end, the offset is the relative offset from the object data start that points to the object references, and the enhanced data stream is formatted in such a manner as to provide backward compatibility with the simple data stream, so that a program that is only capable of processing the simple data stream can access the enhanced data stream as the simple data stream.

11. The apparatus of claim 10, wherein the logic for extracting comprises logic for streaming the data out of the object.

12. The apparatus of claim 10, wherein the object is a native object.

13. The apparatus of claim 10, wherein the object is a custom object and the data is extracted by a custom object enabler.

14. The apparatus of claim 10, wherein the relocated data is relocated to a contiguous section within the serialized object stream.

15. The apparatus of claim 10, wherein the relocated data is prepended to the object references.

16. The apparatus of claim 10, wherein the relocated data includes an offset, offset flag and presence indicator, the offset is a relative offset from the object references that points to the relocated data, the offset flag indicates a type of offset, and the presence indicator indicates whether the relocated data is prepended to the object references.

17. The apparatus of claim 10, wherein the enhanced data stream is processed as an existing data stream, due to the relocated data's reverse offset layout, thereby providing the backward compatibility.

18. The apparatus of claim 10, wherein the relocated data includes optional type information.

19. An article of manufacture comprising a non-transitory program storage medium readable by a computer and embodying instructions executable by the computer to perform a method for providing data locality in a serialized object stream, comprising:
  (a) extracting, in a computer, data from an object into a serialized object stream, thereby creating a simple data stream comprised of an offset, which is followed by other data, which is followed by object references, wherein the offset, other data and object references are all located between an object data start and object data end, and the offset is a relative offset from the object data start that points to the object references; and
  (b) relocating, in the computer, data of a specified type from the extracted data to a specified location in the serialized object stream, thereby creating an enhanced data stream comprised of the offset, which is followed by the other data, which is followed by the relocated data, which is followed by the object references, wherein the offset, other data, relocated data and object references are all located between the object data start and object data end, the offset is the relative offset from the object data start that points to the object references, and the enhanced data stream is formatted in such a manner as to provide backward compatibility with the simple data stream, so that a program that is only capable of processing the simple data stream can access the enhanced data stream as the simple data stream.

20. The article of claim 19, wherein the extracting step comprises streaming the data out of the object.

21. The article of claim 19, wherein the object is a native object.

22. The article of claim 19, wherein the object is a custom object and the data is extracted by a custom object enabler.

23. The article of claim 19, wherein the relocated data is relocated to a contiguous section within the serialized object stream.

24. The article of claim 19, wherein the relocated data is prepended to the object references.

25. The article of claim 19, wherein the relocated data includes an offset, offset flag and presence indicator, the offset is a relative offset from the object references that points to the relocated data, the offset flag indicates a type of offset, and the presence indicator indicates whether the relocated data is prepended to the object references.

26. The article of claim 19, wherein the enhanced data stream is processed as an existing data stream, due to the relocated data's reverse offset layout, thereby providing the backward compatibility.

27. The article of claim 19, wherein the relocated data includes optional type information.

* * * * *